G. DEBLADIS.
CUSHION TIRE.
APPLICATION FILED NOV. 4, 1908.
963,750.
Patented July 12, 1910.
2 SHEETS—SHEET 1.
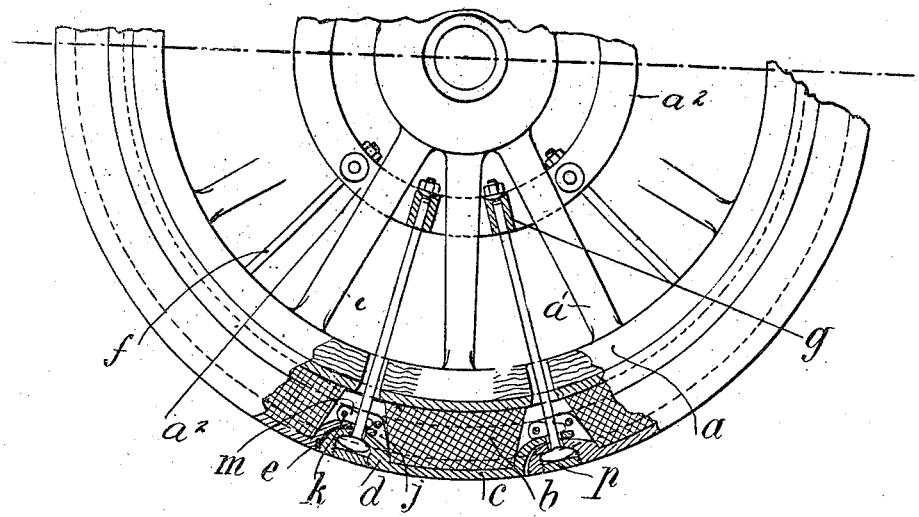
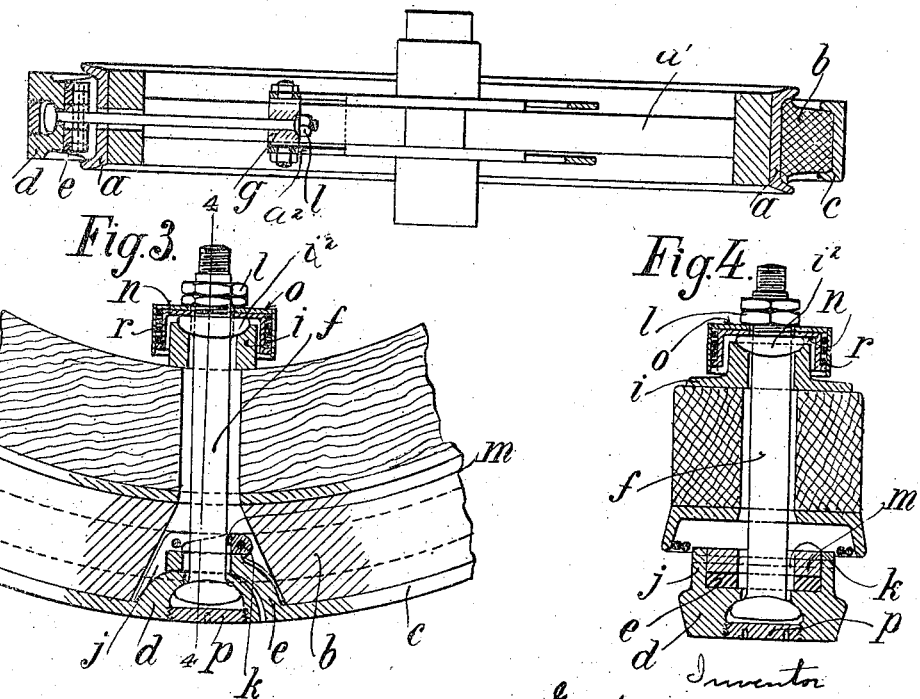

G. DEBLADIS.
CUSHION TIRE.
APPLICATION FILED NOV. 4, 1908.
963,750.
Patented July 12, 1910.
2 SHEETS—SHEET 2.
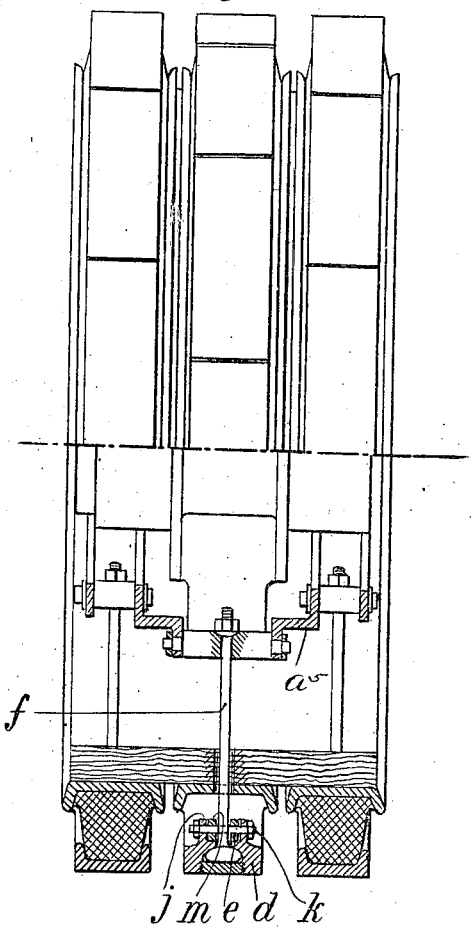
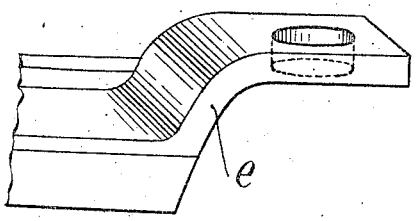
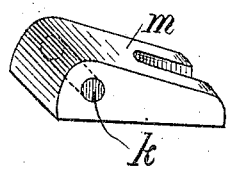
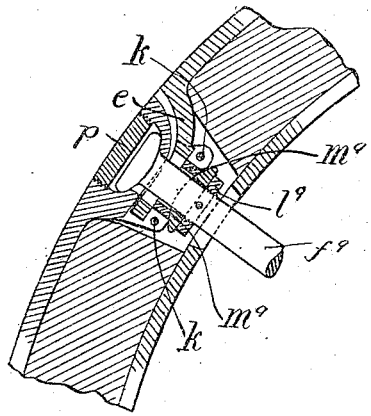
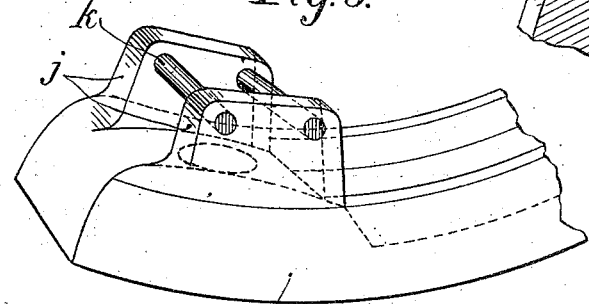

UNITED STATES PATENT OFFICE.

GUSTAVE DEBLADIS, OF PARIS, FRANCE.

CUSHION-TIRE.

963,750.

Specification of Letters Patent. Patented July 12, 1910.

Application filed November 4, 1908. Serial No. 461,008.

*To all whom it may concern:*

Be it known that I, GUSTAVE DEBLADIS, a citizen of the Republic of France, and resident of 3 Rue Cail, Paris, France, have invented certain new and useful Improvements in Cushion-Tires, of which the following is a specification.

This invention relates to an improvement in cushion tires and has for one of its objects to provide a device of this character, wherein the resilient material simply acts as a cushioning device for the wheel and not as the tire tread.

Heretofore, cushion tires have been invented, which provide for the use of elastic or resilient tires, these tires being covered by a metallic shoe. One of the disadvantages of this construction is, however, that metallic shoes as a general rule simply have vertical movement and do not provide for any lateral movement of the metallic shoe. The present invention overcomes this objectionable feature by providing a plurality of shoes which are so connected that they permit of lateral, vertical or oblique movement of the shoes to conform with the deformations of the resilient or elastic member.

Further objects and advantages of the present invention will appear from the following description with reference to the accompanying drawing, wherein, Figure 1 is a side elevation of a portion of a wheel embodying my invention, part thereof being shown in section, Fig. 2 is a sectional view of Fig. 1, Fig. 3 illustrates a detail vertical section of a modified form, Fig. 4 is a cross sectional view taken on the line 4—4 Fig. 3, Fig. 5 is a view, part of which is an end elevation and part a section disclosing a construction wherein a plurality of tires are secured to the wheel felly, Figs. 6 and 7 are detail perspective views of the opposite ends of one of the metallic shoes, Fig. 8 is a perspective view of the movable supporting guide, and Fig. 9 illustrates a modified form of my invention.

Referring more specifically to the drawings, wherein like letters of reference indicate like parts throughout the different views, $a$ designates an inner rim, which is provided with the usual spokes $a^1$. Secured to this rim and suitably spaced apart are a plurality of elastic or resilient members $b$, these members being made of any suitable material (preferably rubber). Each of the resilient members $b$ is provided with a metallic shoe $c$, which extends a suitable distance beyond the terminals of the resilient members. These shoes $c$ have at one end an enlarged head portion $d$, a pair of transverse lugs $j$ extending from the inner face of said head portion and connected by means of the transverse rods $k$, while the opposite end is suitably formed into the flanged portion $e$.

In assembling the parts thus far described, the shoes $c$ are placed upon the resilient members $b$ so that the flange portion $e$ of each shoe will receive the enlarged head portion $d$ of the adjacent shoe, each of these parts being provided with a suitable bearing through which passes the retaining bolt $f$, which continues through an aperture formed in the rim $a$ and secured to a concentric ring $a^2$ by any suitable means. It will be seen that the bearings formed in the flanged portion $e$ and in the enlarged portion $d$ of the metallic shoe and also the apertures in the rim $a$ are slightly larger than the diameter of the rod $f$, whereby the said rod is permitted a limited amount of play.

It will be understood that the flanged portion $e$ of one shoe enters between the two upright flanges $j$ on the enlarged head portion of the adjacent shoe, being retained in place by means of the rod $f$ and also the rods $k$. In order to increase the surface of contact between the rods $k$ and the flanged portion $e$, a movable supporting guide $m$, which is pivotally secured to one of the rods $k$, may be employed, said guide being adapted to follow the positions of the flanged portion $e$. The head portion $d$ of the metallic shoes, is provided with a socket formation, wherein the enlarged semi-spherical head of the rod $f$ is adapted to fit, forming a substantially universal joint, while the opposite or flanged end $e$ of the adjacent metallic shoe has a bearing surface on the inner face of the enlarged head portion $d$, thus allowing the three elements, i. e. the head portion $d$ of one shoe, the flanged portion $e$ of the adjacent shoe and the rod $f$, to have relative independent movement.

As has heretofore been stated, the head portion $d$ is provided with a pair of parallel flanges $j$ extending longitudinally of the shoe, and between which flanged member $e$ is adapted to fit, while a pair of transverse bars or rods $k$ extend between the two flanges and prevent the displacement of the member $e$. These rods $k$, are very important inasmuch as they hold the two adjacent shoes from displacement but at the same time permit relative movement between the two.

The rods $f$ may be arranged in a variety of ways, as shown in Fig. 1 where the converging ends are secured to a ring arranged concentric to the hub of the wheel, or as shown in Fig. 3. In this instance, the concentric ring is dispensed with and the rods project but a short distance beyond the inner rim $a$ where they terminate with a screw threaded end portion. A suitable elastic block $i$ is placed about the inner end of the rod and receives a bearing head $i^2$ which bears against the recessed face of the block $i$. This bearing head is held in place by means of nuts $l$ adjusted on the screw threaded ends of the rods $f$. Interposed between the bearing block $i$ and the nuts $l$ are the flanged casings $n$ and $o$, having the tension spring $r$ so placed between them that the casing $n$ is forced against the bearing block $i^2$, while the casing $o$ is forced in against the nut $l$, which consequently serves to hold the rod $f$ in correct position. The function of this spring $r$ is simply to prevent the rattling of the different parts as the shoes are displaced by contact with the road bed and at the same time to assist in holding the different parts in their applied positions.

Referring now to Fig. 5 a construction is disclosed which is adapted to be used with heavy vehicles, and where a plurality of small tires arranged in series are preferable to one large one. Substantially the only difference embodied in this construction over that of Fig. 1 is that the concentric ring $a^5$ which is adapted to receive the converging ends of the tension bolts $f$ is composed of a number of separable parts secured together by fastening means of suitable character.

In Fig. 9 another arrangement of the guiding plate or block $m^9$ is shown being carried by a spherical shaped member, which in turn is made integral with a nut $l^9$, this nut $l^9$ screwing on to threads formed directly on the rod $f^9$, thus holding the guide in proximity to the flanged portion $e$ of the metallic shoe but permitting the shoe to follow the compression or deformation of the resilient segment.

To prevent the accumulation of dust, dirt and other foreign elements and to provide for some means whereby the joints formed by the junction of the adjacent shoes and the rods $f$, may be lubricated, the socket formation of the head portion $d$ is adapted to receive the cover $p$, thus permitting any suitable lubricant to be placed in the socket and the cover $p$ adjusted.

From the above description, it will be seen that any deformation of the elastic segment which may occur either because of the weight of the load or because of obstructions in the road, will be readily followed by the metallic shoes.

Having thus described my invention, what I claim as new therein and desire to secure by Letters Patent is:—

1. In a resilient tire, a plurality of metallic shoes, each of said shoes comprising an enlarged head portion, provided with a socket formation, a stay bolt, having an enlarged semi-spherical end, which is adapted to fit in the socket formation, whereby said stay bolt and metallic shoe have independent relative universal movement.

2. In a resilient tire, the combination with a wheel rim, of a plurality of metallic shoes secured about said rim provided at their opposite ends with an enlarged head, the inner face thereof presenting a curved surface, and a flanged portion respectively, the flanged portion of one shoe constructed to bear against the curved surface of the enlarged head of the adjacent shoe, and independent means flexibly connecting the adjacent shoes, whereby said shoes and means are capable of relative universal movement.

3. In a resilient tire, a plurality of metallic shoes, each of said shoes comprising a hollow semi-spherical head portion and a flanged end portion, the flanged end portion of one shoe constructed to bear against the curved surface of the head portion of the adjacent shoe, means positioned within said head portion for connecting the co-adjacent shoes, and a guide block pivotally carried by the head portion for normally holding the flanged end portion of one shoe in contact with the adjacent shoe.

4. In a resilient tire, a plurality of metallic shoes, each of said shoes comprising a hollow semi-spherical head, and a flanged end portion, the flanged end portion of one shoe flexibly held against the curved face of the semi-spherical head, and a cover for said head, whereby the outer face of each shoe will present an unbroken tread surface.

5. In a resilient tire, the combination with a plurality of metallic shoes forming the tread surface thereof, of independent means having ball and socket connection with said shoes for flexibly securing the same together, whereby said means are capable of substantially universal movement in relation to said shoes.

6. In a resilient tire, the combination with a plurality of metallic shoes forming the tread surface thereof, and securing rods having ball and socket connection with the respective shoes whereby said rods and shoes are capable of relative universal movement.

The foregoing specification signed at Paris this 23rd day of October, 1908

GUSTAVE DEBLADIS.

In presence of two witnesses—
EDWARD WOLF,
H. C. COXE.